United States Patent [19]
Swanger et al.

[11] Patent Number: 5,812,052
[45] Date of Patent: Sep. 22, 1998

[54] SWITCH OPERATED ACTUATING DEVICE

[75] Inventors: Eric D. Swanger, Huntersville; Emmett C. Russell, Concord, both of N.C.; Michael E. Liedtke, Massillon; Mark R. Albrecht, Stow, both of Ohio

[73] Assignee: Specialty Manufacturing Company, Pineville, N.C.

[21] Appl. No.: 959,752

[22] Filed: Oct. 29, 1997

[51] Int. Cl.[6] .................................................. B60Q 1/26
[52] U.S. Cl. ..................... 340/433; 340/480; 340/487; 318/281; 318/282
[58] Field of Search .................... 340/433, 476, 340/480, 487, 548, 552, 686, 687; 280/765.1, 766.1; 293/21; 318/282, 281, 280; 40/466, 465, 463, 464

[56] References Cited

U.S. PATENT DOCUMENTS

| | | | |
|---|---|---|---|
| 4,138,668 | 2/1979 | Latta et al. | 340/433 |
| 4,339,744 | 7/1982 | Latta | 340/433 |
| 4,559,518 | 12/1985 | Latta | 340/433 |
| 4,697,541 | 10/1987 | Wicker | 116/28 R |
| 4,983,949 | 1/1991 | Wicker | 340/433 |
| 5,038,136 | 8/1991 | Watson | 340/480 |
| 5,357,239 | 10/1994 | Lamparter | 340/433 |

*Primary Examiner*—Edward Lefkowitz
*Assistant Examiner*—Daryl C. Pope
*Attorney, Agent, or Firm*—Kennedy Covington Lobdell & Hickman LLP

[57] ABSTRACT

An actuating device for operating a safety unit mounted on a vehicle which includes a motor having an output shaft, a movable support for supporting the safety unit and moving it between its retracted and extended positions, and a non-mechanical switch arrangement that includes a pair of beam generators and sensors located in the path of the beams, and a plate for interrupting the beam and generating one control signal, and permitting passage of the beam to the sensor to generate another control signal. A control circuit is provided to operate the motor and movable support between its retracted and extended positions in response to the sensor's signals.

11 Claims, 5 Drawing Sheets

SWITCH OPERATED ACTUATING DEVICE

BACKGROUND OF THE INVENTION

The present invention relates generally to devices that are used to operate safety units associated with vehicles, such as crossing arms, stop arms and the like which are mounted on school buses for selective movement outwardly therefrom to provide barriers, warning devices or similar safety measures.

It is, of course, well known that children, particularly young children, who are transported in school buses are vulnerable to accidents involving the school bus or the children themselves during the time they are leaving or approaching the school bus, and it is therefore common practice to provide school buses with safety units that are designed to reduce the risk of such accidents.

One familiar safety unit that is almost universally found on school buses is the octagonal stop sign that is usually mounted on one side of the school bus, and that is movable from a normal retracted position along the side of the school bus to an extended position projecting outwardly from the side of the bus to warn other motorists that children are leaving or approaching the school bus so that such motorists can stop all movement of their vehicles until the children have safely boarded the bus or cleared the area after leaving the bus. Typical stop sign safety devices of this type are disclosed in Latta U.S. Pat. Nos. 4,138,668; 4,339,744; and 4,559,518.

Another familiar safety unit frequently found on school buses is a crossing arm that is usually mounted on the front bumper of the school bus and that is arranged for pivotal movement from a first retracted or passive position at which the generally lengthy crossing arm extends along and adjacent the bumper to a second active position at which it extends outwardly and generally perpendicular with respect to the bumper, thereby providing a barrier that forces children to walk in a path well away from the front bumper of the school bus so that the driver of the school bus can readily see the children and avoid moving the bus until they have cleared the area in front of the bus. The construction and operation of crossing arms of this type are disclosed in greater detail in Latta U.S. Pat. No. 4,559,518, Wicker U.S. Pat. No. 4,697,541 and Runkle U.S. Pat. No. 3,153,398.

Safety units of the above-described type that are operated electrically universally include mechanically operated switches that control the electric motor which moves the unit between its retracted and extended positions. In the older electrical units of the type disclosed in the above-listed Latta patents, the mechanical switches included a plunger that was mechanically depressed by a pivoted sensing arm when the sensing arm was physically engaged by an arm that is rotated by the motor as it moves the safety unit between its two positions.

A significant improvement in these mechanical switches is offered in Wicker U.S. Pat. No. 4,983,949, which discloses the use of small micro-switches which are mechanically actuated as limit switches by a rotating cam member to control the electric motor.

However, because of the severe environments in which school buses and similar vehicles are sometimes required to operate, mechanical switches, including even the improved mechanical switches disclosed the aforesaid Wicker U.S. Pat. No. 4,983,949, may encounter significant problems in some of these environments.

More specifically, commercial practicalities demand that these mechanical switches be relatively low in cost, and that they operate in an unsealed and relatively inexpensive housing mounted on the vehicle, and, as a result, the mechanical switches are constantly exposed to moisture, dirt and dust which frequently leads to non-conductive corrosion and/or freezing of the movable mechanical parts of the switch, and mechanical failure due to component wear. Similarly, these switches are exposed to significant temperature differentials that can cause excessive expansion and contraction of the switch components and adversely affect the accuracy of the switches in turning the motor on and off at the proper time. These problems are exacerbated when the switches are used in operating units for crossing arms that are located on the front bumper of a school bus which is near the ground and therefore tends to pick up large quantities of moisture and dirt and dust as the school bus moves along wet or dusty roads.

Apart from the above, the moving parts which are inherently included in mechanical switches of the aforesaid type cause wear, lost spring tension within the switch, and mechanical fatigue or failure over time. Moreover, the electrical current passing through and across the mechanically engaging parts can result in electrical failure caused by burned electrical contacts.

Finally, commercially available mechanical switches used in operating safety units of this type generally have a wide tolerance band in terms of accuracy, and, in some cases, the switches will result in the crossing arm or stop arm operating outside of federal regulations for accuracy of positioning of these units at their retracted and/or deployed positions because the unit coasts past its intended position. If the mechanical switch is operated utilizing an actuating cam, the potential for inaccuracy in positioning the safety units is compounded by normal wear of the cam.

The present invention provides an actuating device of the aforesaid type that eliminates or ameliorates the drawbacks associated with conventional actuating devices employing mechanical switches as described above.

SUMMARY OF THE INVENTION

The present invention provides an apparatus and method for operating a safety unit which is mounted on a vehicle or the like and moved between a first retracted position and a second extended position, and which includes a motor unit having a rotating output shaft, and a movable support for supporting the safety unit and being movable between the aforesaid retracted and extended positions. A switch housing is provided, and is formed with an opening therein. The switch housing also includes a device located on one side of the opening for generating a beam that passes across the opening; a sensor located at the other side of the housing and located in the path of the beam for generating a first signal when the beam is sensed and for generating a second signal when the beam is not sensed; and a plate attached to the drive shaft for rotation therewith, such plate being disposed within the opening and being formed with first portions that block the passage of the beam across the opening at predetermined positions of the plate during the rotation thereof, and being formed with second portions for permitting the beam to pass across the opening at other predetermined positions of the plate during the rotation thereof. A control system is provided for operating the motor unit in response to one of the signals to move the support between its aforesaid retracted and extended positions, and for operating the motor unit in response to the other of the signals for stopping movement of the support.

In the preferred embodiment of the present invention, the plate is circular with a portion thereof having a radius that disposes such portion within the path of the beam during rotation of the plate, and notches are formed in the plate at the periphery thereof to permit the beam to pass through the notches and across the opening during rotation of the plate. Preferably, two beam generators are provided and are disposed at 180-degree intervals relative to the rotation of the plate, and a separate beam sensor is located in the path of each of the beams generated by the beam generators. The control system may operate the motor unit to instantaneously reverse the direction of rotation of the drive shaft and the support in response to receipt of the other signal from the beam sensors.

DESCRIPTION OF THE PREFERRED EMBODIMENT

Figure 1:
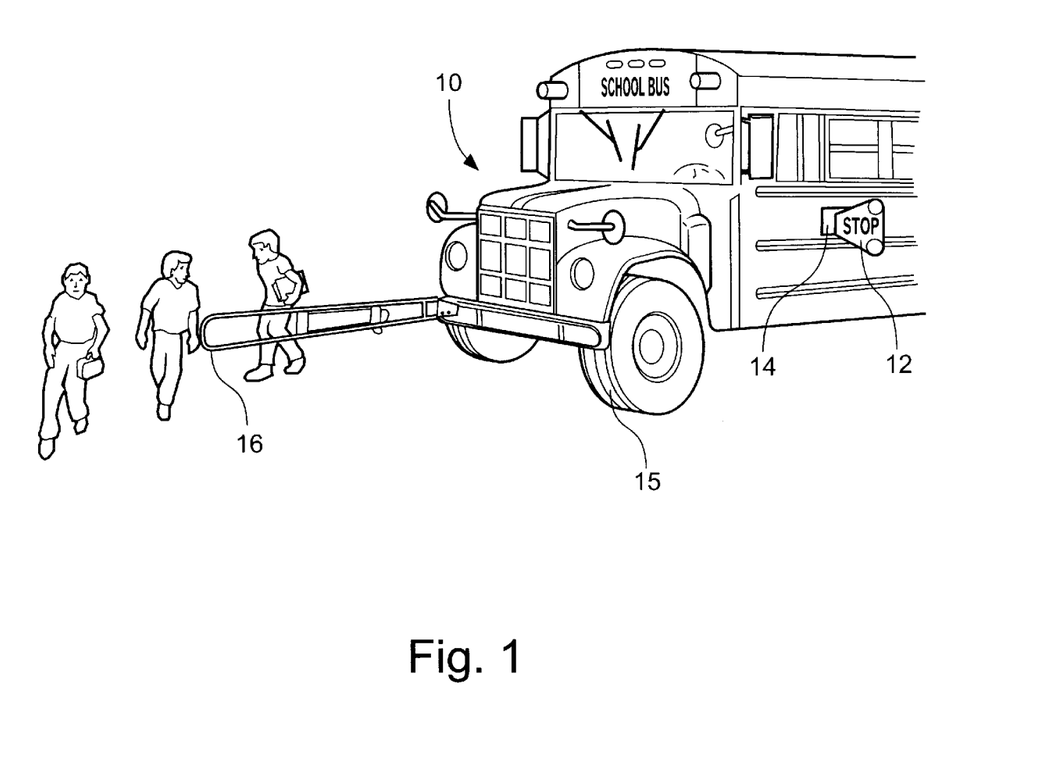
FIG. 1 illustrates a school bus employing a crossing arm and stop arm safety units operated by the actuated device of the present invention.

Looking now in greater detail at the accompanying drawings, FIG. 1 illustrates a typical school bus 10 having two types of safety units associated therewith, namely stop arm 12 carried at the side of the bus in a housing 14 for movement between a retracted position along side the bus and an extended position at which it extends outwardly from the side of the bus in a generally perpendicular relation thereto, and a crossing arm 16 carried in a housing 14 attached to the front bumper 18 of the bus 10, the crossing arm 16 being movable between a retracted position at which it extends along the length of the bumper 18 and an extended position at which it extends generally perpendicular to the bumper 18 as shown in full lines in FIG. 1. The stop arm 12 performs the well-known function of alerting motorists in the vicinity of the school bus that the school bus has stopped to load or unload children, and the crossing arm 16 is moved in a predetermined path of movement when the school bus has stopped to load or unload children, whereby the children are required to walk around the crossing arm 16 in full view of the driver of the school bus so as to avoid any accidental movement of the school bus when a child is located in front of the school bus. All of the foregoing is conventional, and the present invention relates to an improved switch operated actuating device for moving safety units of this type between their retracted and extended positions.

Figure 2:
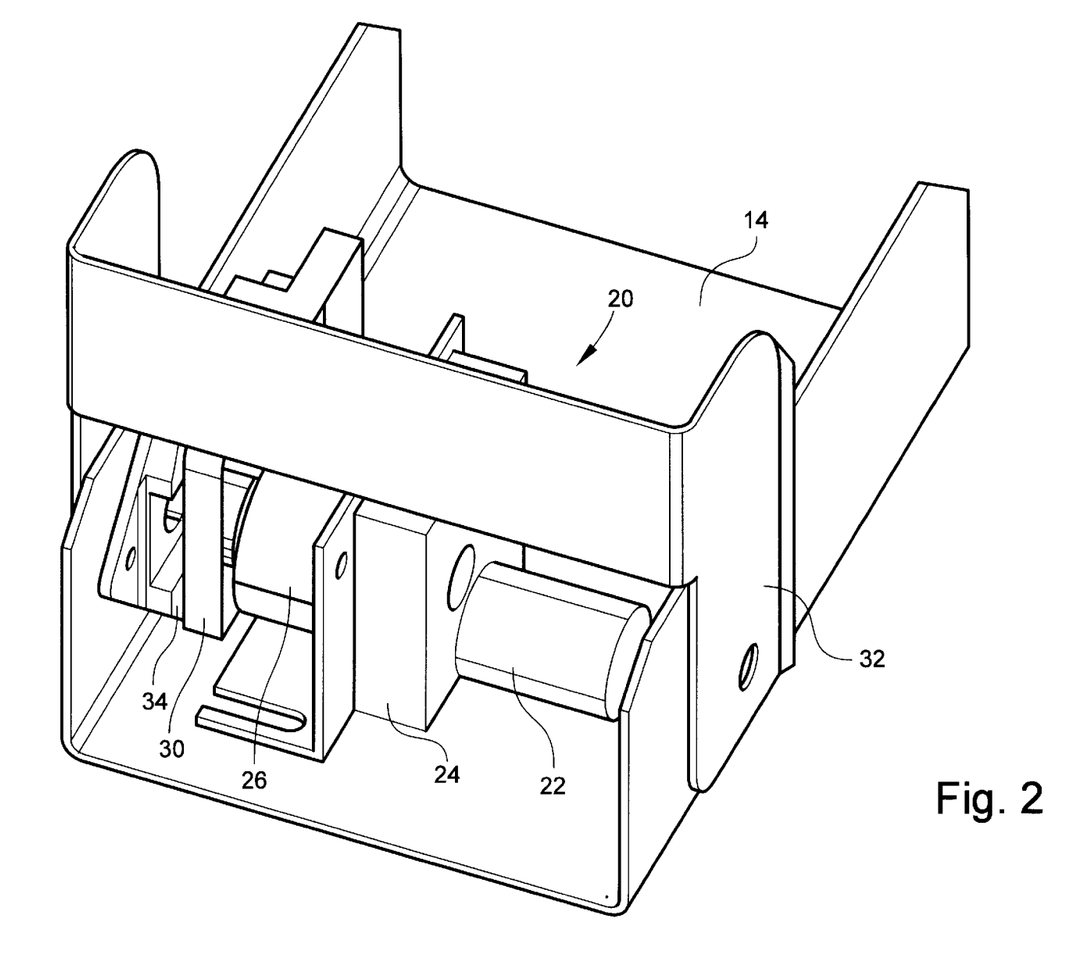
FIG. 2 is a perspective view of the actuating device of the present invention.
Figure 3:
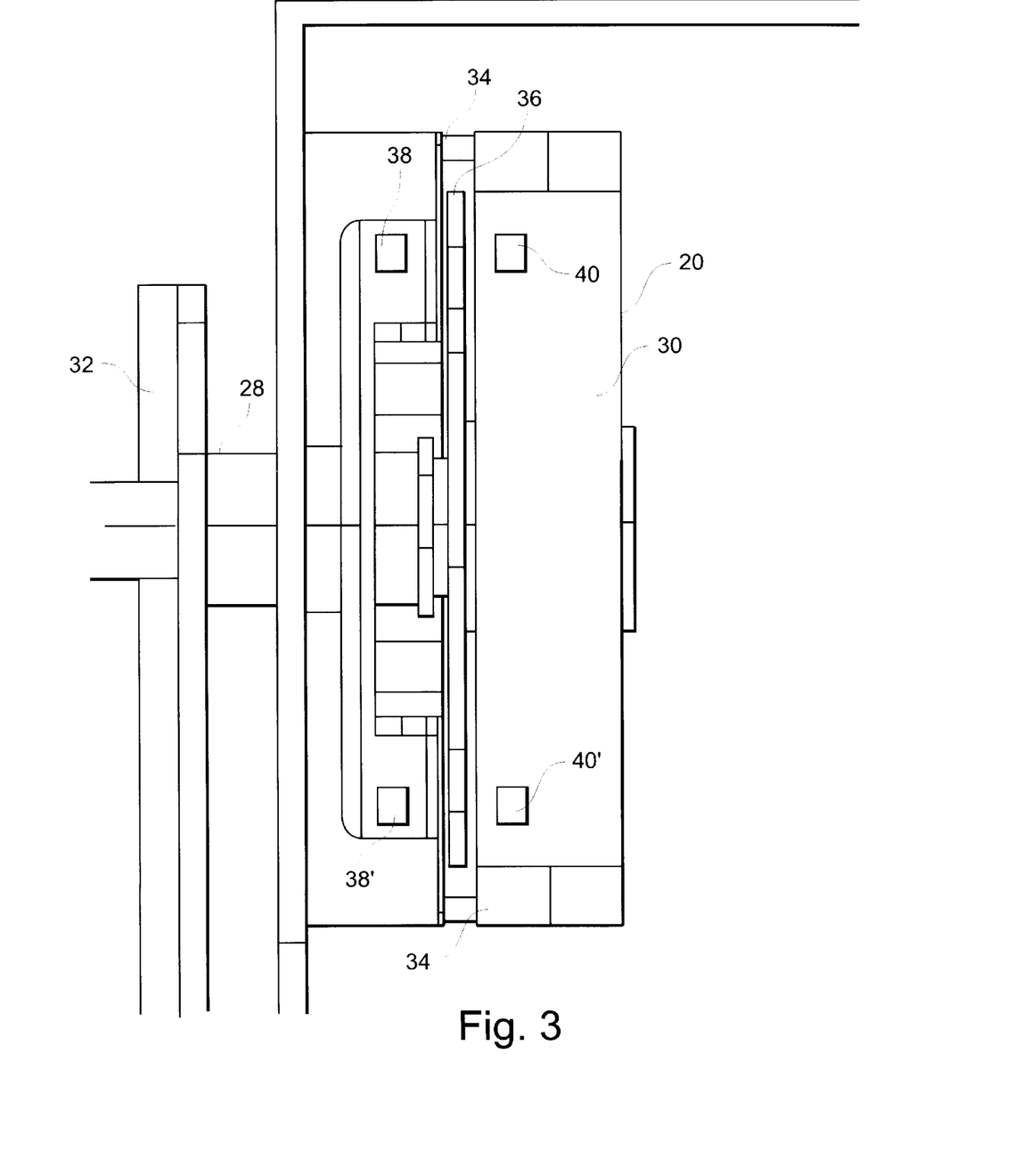
FIG. 3 is a detailed view of the rotating plate and beam sensing arrangement of the present invention.

The actuating device 20 of the present invention is best illustrated in FIGS. 2 and 3, and it includes a conventional motor unit consisting of a D.C. reversible electric motor 22 connected to a gear reduction unit 24 which, in turn, is connected to a slip clutch 26 having an output drive shaft 28 that extends through a switch housing 30, which will be described in greater detail below, to a connection with a pivot arm 32. Except for the switch housing 30, all of these elements are conventional, and are described in greater detail in Wicker U.S. Pat. No. 4,983,949. The pivot arm 32 supports a safety unit, such as the aforesaid stop arm 12 or the aforesaid crossing arm 16, and when the motor 22 is operated in one direction of rotation, it moves the pivot 32 and the safety unit supported thereby from its retracted to extended position (which is illustrated in FIG. 2), and when the motor 22 is operated in the opposite direction, it will move the pivot arm 32 and the safety unit supported thereon back from its extended or deployed position to its retracted position.

As best seen in FIG. 3, the switch housing 30 is formed with a large opening or slot 34, and the output drive shaft 28 extends perpendicularly across the opening 34, and an operating plate 36 is attached to the drive shaft 28 for rotation therewith, the plate 36 being disposed within the opening 34 of the switch housing 30 for rotation therein when the drive shaft 28 rotates. A pair of beam generators 38, 38' are mounted in the switch housing 30 on one side of the opening 34, and these two beam generators are disposed at 180-degree intervals or spacings relative to the rotation of the plate 36 for generating and directing a linear beam across the opening 34. A pair of beam sensors 40, 40' are mounted in the switch housing 30 on the other side of the opening 34 and directly in the path of the beams generated by the beam generators 38, 38' respectively.

As will be explained in greater detail below, the sensors 40, 40' generate a first control signal when the presence of a beam is sensed, and they generate a second control signal when no beam is sensed. In the preferred embodiment of the present invention, the beam generators 38, 38' and sensors 40, 40' operate on the Hall-effect principle by which the beam is in the form of a magnetic field extending between the beam generators 38, 38' and the sensor 40, 40' such as the sensor manufactured by Allegero, as its model #UGN3141ELT. When sensors of this type are used, the plate 36 will be made from a ferromagnetic material. However, it is to be understood that other equivalent beam and sensor arrangements could be used in the present invention, such as a photo-electric system by which the beam generated is a light beam, and the sensor is a photo-electric sensor for sensing the presence of the light beam.

Figure 4:
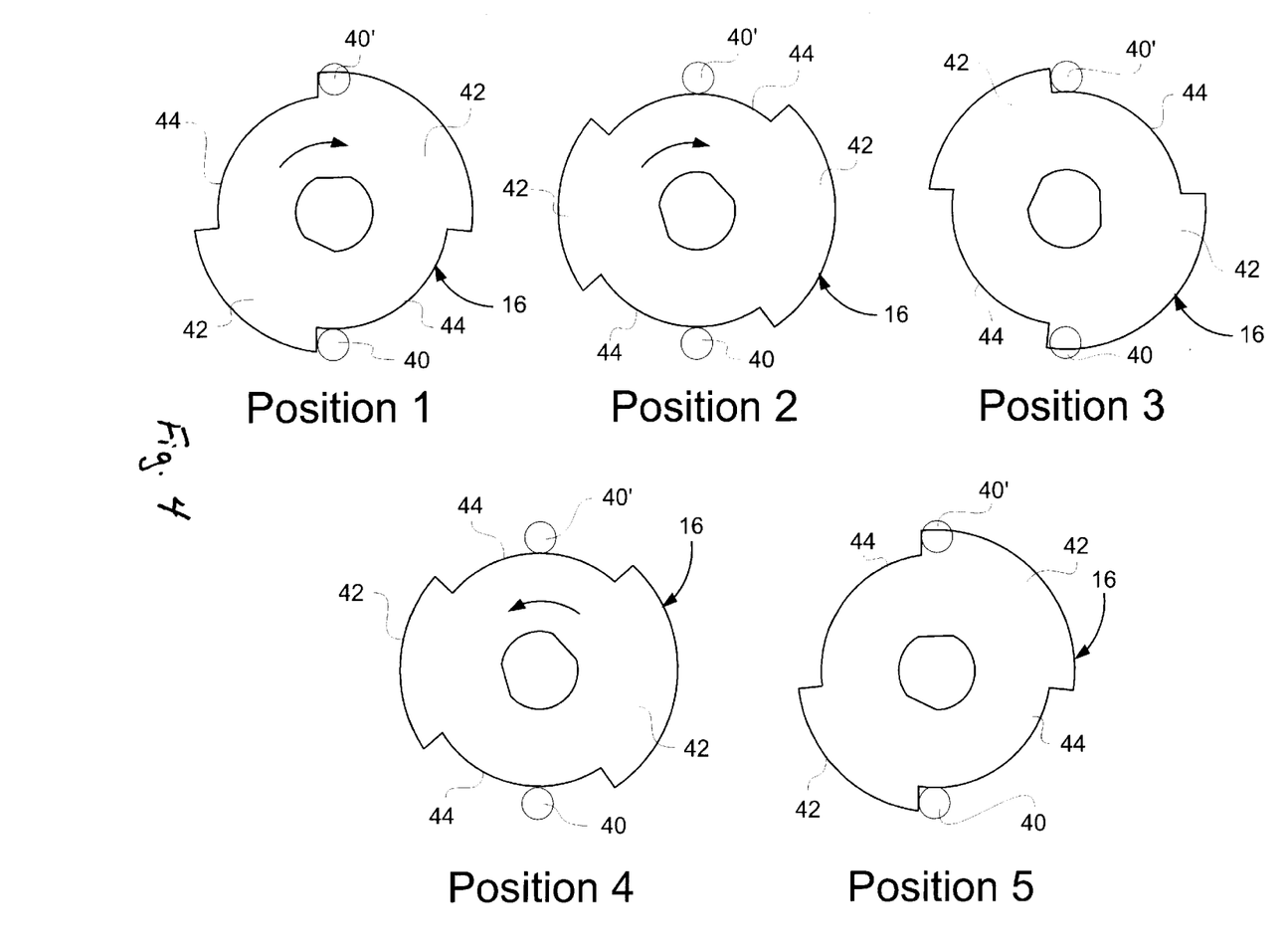
FIG. 4 is a diagrammatic view illustrating the sequence of operation of the beam sensing arrangement as the plate rotates.

As best seen in FIG. 4, the operating plate 36 is generally circular, and it is formed with diametrically opposed portions 42 which has an enlarged radius, and diametrically opposed notches 44 formed in the periphery of the plate 36. The radius of the enlarged portions 42 is such that when the plate 36 is rotated, the enlarged portions will be disposed within the path of the beam generated by the beam generators 38, 38' during a portion of the rotation of the plate 36 to block the passage of the beam to the sensor 40, 40'. Similarly, the notches 44 are dimensioned so that they will permit passage of a beam between the beam generators 38, 38' and sensors 40, 40' when the notch 44 is disposed therebetween. As indicated above, each of the sensors 40 generates a first control signal when the passage of the beam from the affiliated beam generator 38 is blocked by the enlarged portions 42 of the plate 36, and will generate a second control signal when a beam passes through a notch 44 and is sensed by the sensor 40.

Figure 5:
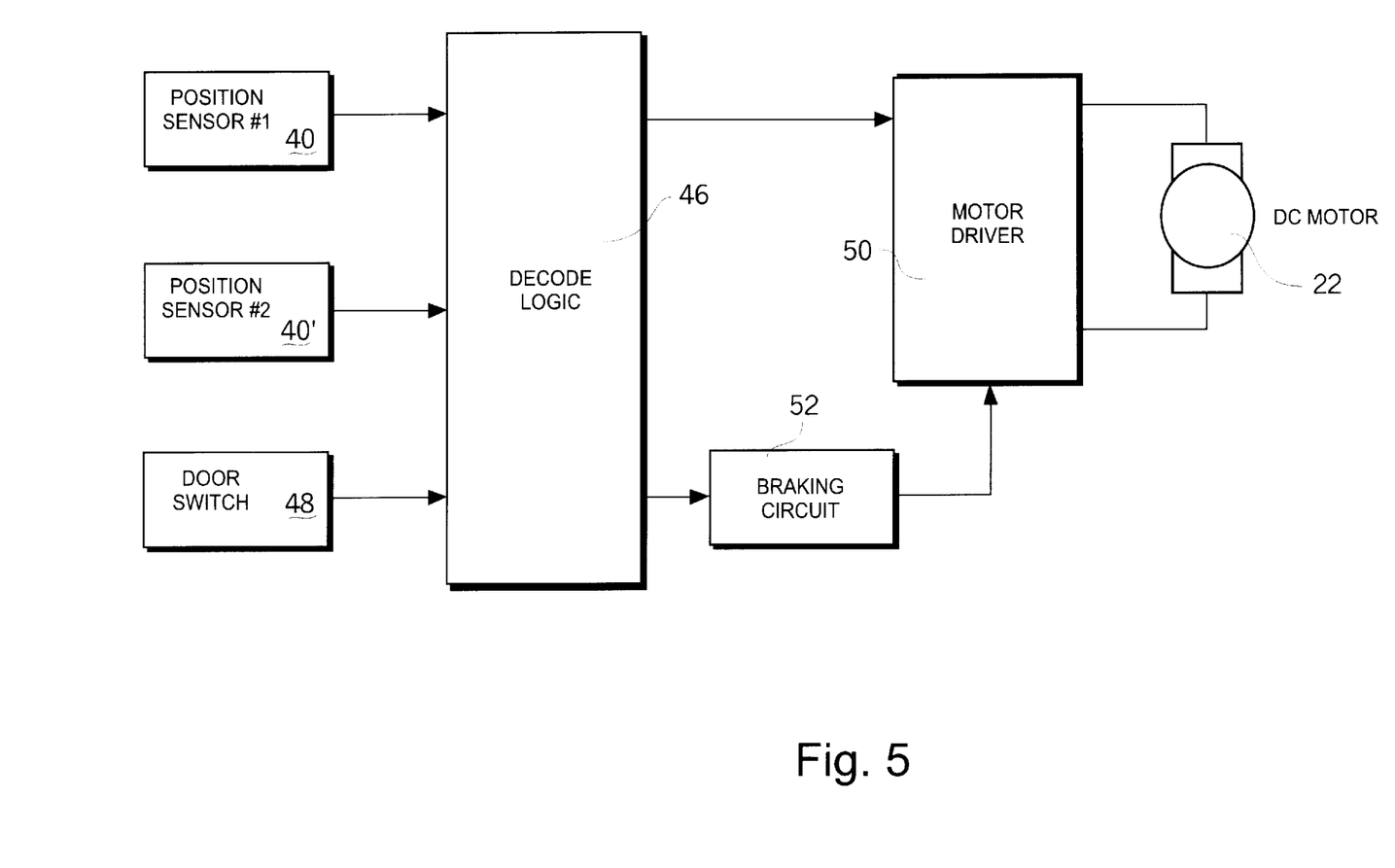
FIG. 5 is a schematic view of the electrical control system of the present invention.

The control system for the present invention is illustrated schematically in FIG. 5 and it includes the two above-described sensors 40, 40', each of which transmits its aforesaid first and second control signals to a conventional logic circuit 46, and a operator switch 48 also transmits an on-off signal to the decode logic circuit 46. The control switch 48 may be a manually operated switch located within the school bus for operation by the school bus driver, or, preferably, the switch 48 is disposed adjacent the front door of the school bus 10 in a conventional manner, and as described in greater detail in Wicker U.S. Pat. No. 4,983,949, whereby the door switch is normally in its off position when the door of the school bus is closed, and the switch 48 is automatically moved to its on position anytime the front door of the school bus 10 is opened to permit children to board or exit the school bus 10. As will be explained in greater detail below, depending on the particular signals generated by the sensors 40, 40' and switch 48, the logic circuit will transmit a signal to the motor driver circuit 50 to control the operation of the motor 22, and, as will also be explained in greater detail below, the decode logic circuit 46 will also transmit a signal to a braking circuit 52 which will, in turn, transmit a signal to the motor driver circuit 50 to positively brake or stop rotation of the drive shaft 28 by the motor 22 as will be described in greater detail below.

The control sequence for the motor 22 when signals from the door switch 48, and sensor 40, 40' can be best be understood by reference to FIG. 4, and the following chart:

| POSITION PLATE 36 | DOOR SWITCH 48 | SENSOR 40 | SENSOR 40' | MOTOR 22 |
| --- | --- | --- | --- | --- |
| 1 (retracted) | off | off | on | Stop |
|  | on | off | on | Start to Deploy |
| 2 (intermediate) | on | off | off | Move to Deploy |
| 3 (Deployed) | on | on | off | Stop |
|  | off | on | off | Start Retract |
| 4 (intermediate) | off | off | off | Move to Retract |
| 5 (Retracted) | off | off | on | Stop |

In considering FIG. 4 and the above chart, it will be understood that the door switch 48 is in its off position when the door of the school bus is closed, and is in its on position when the school bus door is opened by the operator as explained above. The sensors 40, 40' are off when a beam is being sensed by the sensor, and they are in their on position when the beam across the opening 34 is blocked by one of the enlarged portions 42 of the plate 36.

When the school bus 10 is in its normal operating condition and is either traveling down the road or stopped, but without opening the door to permit children to embark or disembark, the plate 36 is in Position 1 as illustrated in FIG. 4 and shown in the above chart. Since the door is closed, the switch 48 is off, and the sensor 40 is off because it is adjacent one of the notches 44 so that a beam is beamed sensed, and sensor 40' is on because one of the enlarged portions 42 of the plate 36 is blocking the passage of the beam to sensor 40'. Thus, at position 1 of the plate 36, the motor 22 is stopped with the pivot arm 32 (and the safety unit supported thereon) is in its retracted position.

When the school bus 10 is stopped, and the operator opens the school bus door to permit children to embark or disembark, switch 48 changes from its off position to its on position as indicated by the second line in the above chart. The control circuit 46 is designed so that in this condition the motor will energized and will start from its retracted position towards its deployed position. Position 2 of the plate 36 is the position it assumes when it is intermediate its travel from the retracted to the deployed position, and the control circuit 46 will maintain the motor 22 in its energized condition until plate 36 reaches Position 3, at which point sensor 40 changes from its off position to its on position, and the control circuit 46 will stop the motor 22 at this position. It will be apparent the location of the notches 44 on the plate 36 are designed so that when the drive shaft 28 has rotated the pivot arm 32 to its full deployed position, one of the enlarged portions 42 of the plate 36 will be disposed between the beam generator 38 and the sensor 40 as illustrated in position 3 in FIG. 4. The control circuit 46 will remain in this condition until all of the children have embarked or disembarked, at which time the operator will close the school bus door and the door switch 48 will change from its on position to its off position as shown in the chart above, and the control circuit 46 will then re-energize the motor 22 so that it rotates the drive shaft 28 in the opposite position to start the pivot arm 32 moving toward its retracted position, and the control circuit will maintain the motor 22 in this operating condition throughout the intermediate travel of the plate 36 which is illustrated as Position 4 in FIG. 4 and in the chart. When the pivot arm 32 reaches its fully retracted position, namely Position 5, sensor 40' will change from its off position to its on position because one of the enlarged portions 42 of plate 36 will block the passage of the beam thereto, and the control circuit 46 will then stop the motor 22 with the pivot arm 32 at its fully retracted position. If and when the operator of the school bus again opens the door of the school bus 10, the sequence described above will be repeated. Thus, each of the sensors 40, 40' generates two control signals, namely the off signal and the on signal, which are utilized in the control circuitry to move the pivot arm 32 with it attached safety unit back and forth between its retracted and deployed positions.

In addition to the normal operation of the control circuit as described above, the present invention also utilizes the sensors 40, 40' to return the pivot arm 32 to its deployed position if it is temporarily manually moved from that position, such as by a child inadvertently or purposely manually pushing or pulling the stop arm 12 or the crossing arm 16 attached to the pivot plate 32. More specifically, and looking particularly at Position 3 in FIG. 4 and in the chart, which is the position at which the safety is at its fully deployed position, if a child should push the crossing arm 16 past the deployed position, this will cause plate 36 to rotate from Position 3 in a clockwise direction so that sensor 40 will remain its on position and sensor 40' will change from its off position to its on position since both sensor 40 and sensor 40' will be block by enlarged portions 42 of the plate 36. In this condition, the control circuit 46 is designed to re-energize the motor 22 and cause it to rotate drive shaft 28 in a direction that will return pivot arm 32 to its initial deployed position. Similarly, if the child should move the crossing arm back its retracted position, the plate 36 will be in the condition shown in Position 2, and, as described above, the motor 22 is operated to return the pivot arm 32 back to its deployed position at which point the plate 36 will again be at Position 3 and the motor 22 will stop.

In accordance with another feature of the present invention, the control circuit is designed to essentially eliminate any tendency of the pivot plate 32 and its attached safety unit to "coast" past its fully deployed position, which should be perpendicular to either the front bumper of the school bus 10 in the case of the crossing arm 16 or to the side of the bus in the case of the stop arm 12. It is obviously important that the stop arm 12, at its deployed position, be as close to perpendicular as possible so that it can be clearly seen by motorists behind and in front of the school bus 10. Similarly, it is important for the crossing arm 16 to be fully deployed to its perpendicular position so that children passing around the crossing arm 16 will be far enough away from the front of the bus to be seen by the operator of the school bus. Both of these criteria have resulted in federal regulations prohibiting excessive variances of the safety unit from its perpendicular position. However, because of the size and weight of the stop arm 12, and in particular the crossing arm 16, the inertia of the moving pivot plate 32 is sometimes sufficient to cause the pivot plate 32 to coast pass its deployed position even after the motor 22 has been de-energized. To alleviate this problem, one feature of the present invention is to provide a braking circuit 52 which, as illustrated in FIG. 5, is controlled by the central circuit 46 to instantaneously ground both of the conventional electrical power leads to the motor 22 each time the motor 22 is stopped by the control circuit 46, namely when the plate 36 moves to its Position 3, and this grounding action causes resistance to rotation within the motor 22 that quickly stops further rotation of the motor 22. Thus, the same condition of the door switch 48 and the sensors 40, 40' which are utilized to stop or de-energize the motor 22 are also used additionally to stop rotation of the motor 22 so that it is positively stopped with the pivot arm 32 and attached safety unit at its fully deployed position.

It will be apparent from the above that the actuating device of the present invention is a substantial improvement over conventional actuating devices which utilize mechanical switches that inherently have significant drawbacks, as explained in great detail above. By contrast, the sensors 40, 40' of the present invention act as switches which generate off and on control signals solely in response to a beam, preferably consisting of a magnetic field, being sensed by the sensors 40, 40' or being interrupted by the ferromagnetic plate 36 so that no beam is sensed. Accordingly, even though the switch housing 36 is disposed in the actuating device housing 14 and is exposed to moisture, dirt, and dust, these environmental elements do not adversely affect the operation of the sensor 40, 40' because they are no interacting mechanical parts that would ordinarily be affected by such elements. Moreover, because of the simplicity of the structure and the operation of the switch housing 30, the actuating unit of the present invention can be produced at approximately the same cost as conventional units with mechanical switches.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An actuating device for operating a safety unit which is mounted on a vehicle or the like and moved between a first retracted position and a second extended position, said actuating device including:
   (a) a motor unit having a rotating output shaft;
   (b) a movable support for supporting said safety unit and being movable between said retracted and extended positions;
   (c) a switch housing formed with an opening therein, and including:
      (i) means located on one side of said opening for generating a beam that passes across said opening;
      (ii) sensor means located at the other side of said housing and located in the path of said beam for generating a first signal when said beam is sensed and for generating a second signal when said beam is not sensed; and
      (iii) a plate attached to said drive shaft for rotation therewith, said plate being disposed within said opening and being formed with first portions that block the passage of said beam across said opening at predetermined positions of said plate during said rotation thereof, and being formed with second portions for permitting said beam to pass across said opening at other predetermined positions of said plate during said rotation thereof; and
   (d) control means for operating said motor unit in response to one of said signals to move said support between said retracted and extended positions, and for operating said motor unit in response to the other of said signals for stopping movement of said support.

2. An actuating device for operating a safety unit as defined in claim 1, wherein said plate is circular with a portion thereof having a radius that disposes said portion within the path of said beam during said rotation thereof, and wherein notches are formed in said plate to permit said beam to pass through said notches and across said opening during said rotation of said plate.

3. An actuating device for operating a safety unit as defined in claim 1, wherein said beam generating means includes two beam generators disposed at 180-degree intervals relative to the rotation of said plate, and said sensor means includes two beam sensors located in the paths of the beams generated by said beam generators.

4. An actuating device for operating a safety unit as defined in claim 1, wherein said motor has two electrical power leads, and said control mean operates said motor unit to instantaneously ground both said electrical power leads in response to receipt of said other signal.

5. An actuating device for operating a safety unit which is mounted on a vehicle or the like and moved between a first retracted position and a second extended position, said actuating device including:
   (a) a motor unit having a rotating output shaft;
   (b) a movable support for supporting said safety unit and being movable between said retracted and extended positions;
   (c) a switch housing formed with an opening therein, and including:
      (i) two beam generators disposed within said switch housing for generating two beams that pass across said opening at locations disposed at 180-degree intervals to one another;
      (ii) two sensors located at the other side of said housing and located in the path of said two beams, respectively, for generating a first signal when said beam is sensed and for generating a second signal when said beam is not sensed; and
      (iii) a circular plate attached to said drive shaft for rotation therewith, said circular plate being disposed within said opening and being formed with first portions having a radius that disposes them within the path of said beam to block the passage of said beam across said opening at predetermined positions of said plate during said rotation thereof, and being formed with notches at the periphery of said plate for permitting said beam to pass through said notches and across said opening at other predetermined positions of said plate during said rotation thereof; and (d) control means for operating said motor unit in response to one of said signals to move said support between said retracted and extended positions, and for operating said motor unit in response to the other of said signals for stopping movement of said support.

6. An actuating device for operating a safety unit as defined in claim 5, wherein said motor has two electrical power leads, and said control mean operates said motor unit to instantaneously ground both said electrical power leads in response to receipt of said other signal.

7. A method of operating a safety unit which is mounted on a vehicle for movement between a first retracted position and a second extended position, said method including the steps of:

(a) operating a motor unit to rotate a drive shaft;

(b) mounting a safety unit support on said drive shaft for movement therewith;

(c) creating at least one beam that extends across an opening from one side of said opening;

(d) locating a beam sensor on the other side of said opening in the path of said beam and causing said beam sensor to generate a first signal when said beam is sensed to generate a second signal when said beam is not sensed;

(e) mounting a plate on said rotating drive shaft so that it is disposed within said opening, and forming said plate with first portions that block the passage of said beam across said opening at predetermined positions of said plate during rotation thereof by said drive shaft, and forming said plate with second portions that permit said beam to pass across said opening at other predetermined positions of said plate during rotation thereof by said drive shaft; and (f) controlling said motor unit in response of one of said signals to move said support between said retracted and extended positions thereof, and controlling said motor unit in response to the other of said signals to stop the movement of said support.

8. A method of operating a safety unit as defined in claim 7, wherein said method includes the steps of forming said plate with a generally circular shape having portions thereof formed with a radius that disposes said portions within the path of said beam during said rotation thereof, and the step of forming notches in said plate at the periphery thereof to permit said beam to pass through said notches and across said opening during said rotation of said plate.

9. A method of operating a safety unit as defined in claim 7, wherein said method includes the step of disposing two beam generators at 180-degree intervals relative to the rotation of said plate, and disposing two beam sensors located in the paths of the beams generated by said beam generators.

10. A method of operating a safety unit as defined in claim 7, wherein said motor has two electrical power leads method includes the step of controlling said motor unit to instantaneously ground both of said electrical power leads in response to receipt of said other signal.

11. A method of operating a safety unit which is mounted on a vehicle for movement between a first retracted position and a second extended position, said method including the steps of:

(a) operating a motor unit to rotate a drive shaft;

(b) mounting a safety unit support on said drive shaft for movement therewith for moving said safety unit between said retracted and extended positions thereof;

(c) creating at least one beam that extends across an opening from one side of said opening;

(d) locating a beam sensor on the other side of said opening in the path of said beam and causing said beam sensor to generate a first signal when said beam is sensed to generate a second signal when said beam is not sensed;

(e) mounting a plate so that it is disposed within said opening, rotating said plate within said opening during said movement of said safety unit support, and forming said plate with first portions that block the passage of said beam across said opening at predetermined positions of said plate during rotation thereof by said drive shaft, and forming said plate with second portions that permit said beam to pass across said opening at other predetermined positions of said plate during said rotation thereof by said drive shaft; and (f) controlling said motor unit in response of one of said signals to move said support between said retracted and extended positions thereof, and controlling said motor unit in response to the other of said signals to stop the movement of said support.

* * * * *